(12) United States Patent
Anantharaman et al.

(10) Patent No.: US 8,565,765 B2
(45) Date of Patent: Oct. 22, 2013

(54) METHOD AND APPARATUS FOR DETERMINING THE COUNTRY WHERE A MOBILE DEVICE HAS ACQUIRED SERVICE

(75) Inventors: Karthik Anantharaman, San Diego, CA (US); James A. Hutchison, San Diego, CA (US); Bryan Gurganus, San Diego, CA (US); Parag Mohan Kanade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 842 days.

(21) Appl. No.: 12/328,576

(22) Filed: Dec. 4, 2008

(65) Prior Publication Data

US 2010/0099406 A1    Apr. 22, 2010

Related U.S. Application Data (60) Provisional application No. 61/106,300, filed on Oct. 17, 2008.

(51) Int. Cl.
*H04W 4/02* (2009.01)
(52) U.S. Cl.
USPC .............. 455/435.2; 455/432.1; 455/433; 455/435.1; 455/435.3
(58) Field of Classification Search
USPC ............ 455/551, 461, 432.1–435.3, 564, 565
See application file for complete search history.

(56) References Cited

U.S. PATENT DOCUMENTS

| 7,450,064 | B2 | 11/2008 | Rowitch et al. | |
|---|---|---|---|---|
| 7,715,829 | B2 | 5/2010 | Li et al. | |
| 2001/0027108 | A1 | 10/2001 | Sumino | |
| 2003/0100334 | A1 | 5/2003 | Mazzara, Jr. | |
| 2004/0147260 | A1* | 7/2004 | Kim | 455/432.1 |
| 2004/0223477 | A1* | 11/2004 | Iwasaki et al. | 370/338 |
| 2005/0094495 | A1* | 5/2005 | Takada et al. | 368/47 |
| 2005/0176411 | A1 | 8/2005 | Taya et al. | |
| 2006/0068786 | A1* | 3/2006 | Florence | 455/435.2 |
| 2006/0079224 | A1* | 4/2006 | Welnick et al. | 455/432.1 |
| 2006/0160532 | A1* | 7/2006 | Buckley et al. | 455/422.1 |
| 2007/0237121 | A1 | 10/2007 | Khandelwal et al. | |
| 2008/0051151 | A1* | 2/2008 | Bumiller | 455/564 |
| 2008/0253399 | A1 | 10/2008 | Wang et al. | |

FOREIGN PATENT DOCUMENTS

| JP | 2001285939 A | 10/2001 |
|---|---|---|
| JP | 2003333165 | 11/2003 |
| WO | WO03067860 A1 | 8/2003 |
| WO | WO2005109934 | 11/2005 |
| WO | 2006102508 A1 | 9/2006 |

OTHER PUBLICATIONS

International Search Report & Written Opinion—PCT/US2009/061074, International Searching Authority—European Patent Office—Mar. 2, 2010.
Taiwan Search Report—TW098135284—TIPO—Oct. 22, 2012.

\* cited by examiner

*Primary Examiner* — Allahyar Kasraian
(74) *Attorney, Agent, or Firm* — Darren M. Simon (57) ABSTRACT

An apparatus and method for identifying a serving country using at least one system specific parameter comprising extracting the at least one system specific parameter from a forward link signal; determining whether the at least one system specific parameter maps to a unique country; and identifying the serving country for a call.

25 Claims, 5 Drawing Sheets

METHOD AND APPARATUS FOR DETERMINING THE COUNTRY WHERE A MOBILE DEVICE HAS ACQUIRED SERVICE

CLAIM OF PRIORITY UNDER 35 U.S.C. §119

The present Application for patent claims priority to Provisional U.S. Patent Application No. 61/106,300, entitled "METHOD AND APPARATUS FOR DETERMINING THE COUNTRY WHERE A MOBILE DEVICE HAS ACQUIRED SERVICE" filed Oct. 17, 2008, and assigned to the assignee hereof and hereby expressly incorporated by reference herein.

FIELD

This disclosure relates generally to apparatus and methods for determining the country where a mobile device has acquired service. More particularly, the disclosure relates to using system specific (e.g., over the air) parameters to determine the country where the mobile device has acquired service.

BACKGROUND

Mobile user equipments (UEs) are widely deployed devices used throughout the world to allow full-duplex communication between UE users and other users connected to the global telecommunications infrastructure. The types of communication applications handled by mobile UEs include voice, data, image transmission, Internet access, email, text messaging, video transmission, etc. Since mobile UEs are battery-powered, portable devices, their small form factor (i.e., small size) and weight facilitate personal mobility throughout their coverage area.

Several different access techniques may be used to enable mobile UE connectivity with base stations within wireless coverage areas. Different access technologies include frequency division multiple access (FDMA), time division multiple access (TDMA), code division multiple access (CDMA), orthogonal frequency division multiple access (OFDMA), etc.

Mobile UEs may traverse national boundaries if the UE user undertakes international travel. That is, the mobile UE may be subject to different dialing procedures in different countries. One complication that arises with international travel is that UE users would rather not have to administer various direct dialing prefixes when they travel to foreign countries. In one example, the United States uses "011" as the international direct dialing (IDD) prefix. However, in Japan, the international direct dialing prefix is "001". Since different countries use different dialing prefixes, the UE user would have to know and use the appropriate prefixes for each country to place calls when roaming internationally. This feature may make international roaming more complicated and confusing than desirable for the UE user. For example, storing international phone numbers in the address book of the mobile UE may be inconvenient if different dialing prefixes are needed for different countries for the same desired phone number.

SUMMARY

Disclosed is an apparatus and method for determining the country where a mobile device has acquired service from system specific (e.g., over the air) parameters transmitted by a serving base station. According to one aspect, a method for identifying a serving country using at least one system specific parameter comprising extracting the at least one system specific parameter from a forward link signal; determining whether the at least one system specific parameter maps to a unique country; and identifying the serving country for a call.

According to another aspect, a user equipment for identifying a serving country using at least one system specific parameter comprising a processor and circuitry configured to extract the at least one system specific parameter from a forward link signal; determine whether the at least one system specific parameter maps to a unique country; and identify the serving country for a call.

According to another aspect, a wireless device for identifying a serving country using at least one system specific parameter comprising means for extracting the at least one system specific parameter from a forward link signal; means for determining whether the at least one system specific parameter maps to a unique country; and means for identifying the serving country for a call.

According to another aspect, a computer-readable medium including program code stored thereon, comprising program code for extracting the at least one system specific parameter from a forward link signal; program code for determining whether the at least one system specific parameter maps to a unique country; and program code for identifying the serving country for a call.

Advantages of the present disclosure include increase ease in dialing for the user while roaming in another country, decrease errors in dialing while roaming internationally, and alleviating user frustration in international dialing while roaming.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
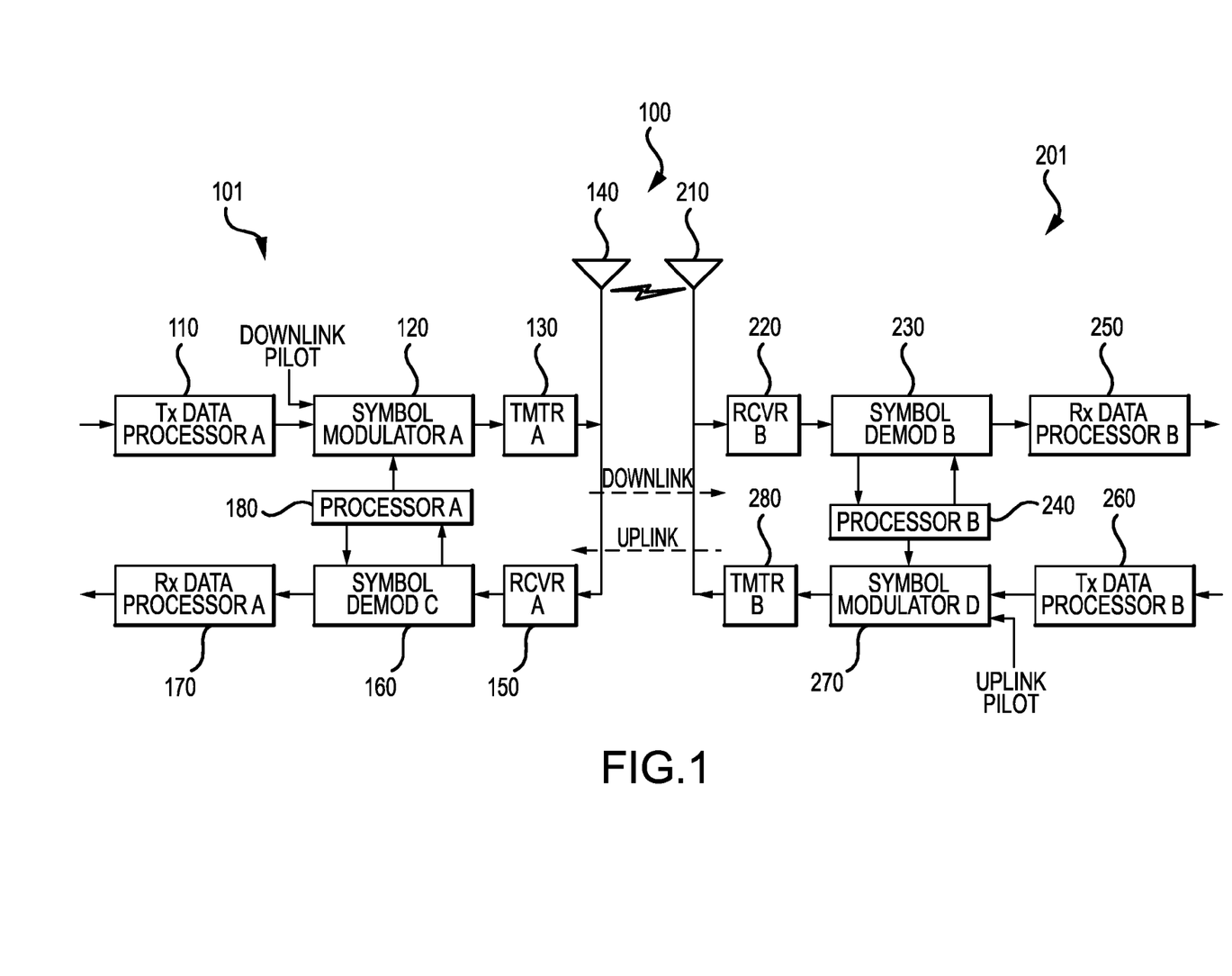
FIG. 1 illustrates an example block diagram of a wireless communication system.

FIG. 1 illustrates an example block diagram of a wireless communication system 100. One skilled in the art would understand that the example wireless communication system 100 illustrated in FIG. 1 may be implemented in an FDMA environment, an OFDMA environment, a CDMA environment, a WCDMA environment, a TDMA environment, a SDMA environment or any other suitable wireless environment.

The wireless communication system 100 includes an access node 101 (a.k.a. base station) and a user equipment or UE 201 (a.k.a. wireless communication device such as a mobile phone). In the downlink leg, the access node 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the wireless communication system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
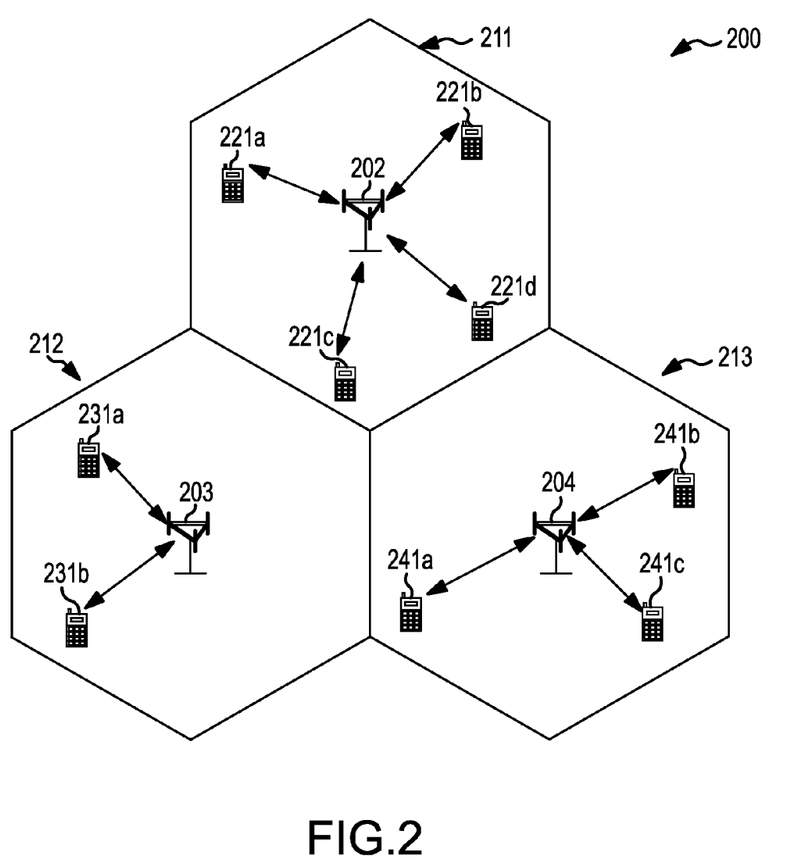
FIG. 2 illustrates an example wireless network with base stations within hexagonal coverage areas respectively.

FIG. 2 illustrates an example wireless network 200 with base stations 202, 203, and 204 within hexagonal coverage areas 211, 212, and 213, respectively. Also shown are mobile UEs 221a, 221b, 221c, and 221d within hexagonal coverage area 211, mobile UEs 231a and 232b within hexagonal coverage area 212, and mobile UEs 241a, 241b and 241c within hexagonal coverage area 213. In one example, mobile UE 221a receives forward link signals from base station 202 and mobile UE 221a transmits return link signal to base station 202. Forward link signals contain certain wireless network information or characteristics such as the System Identification (SID), bandclass (i.e., frequency band) information, Network Identification (NID), local time offset (LTM), daylight savings information (DAYLT), etc. These parameters may be received or identified by the mobile UE 221a to help identify the system and network for the coverage area associated with base station 202. Although the UEs shown in FIG. 2 are illustrated as phones, one skilled in the art would understand that other types of UEs that include phones (e.g., PDAs, etc.) are equally applicable without affecting the spirit and scope of the present disclosure.

To reduce user inconvenience of having to maintain a plurality of international direct dialing prefixes, "+" code dialing is used where the user dials a "+" as the first digit followed by the destination country code and national number being called. The number is then automatically translated into a national or international direct dialed number with the appropriate prefixes for the country from which the call is being originated. Using the "+" code obviates the need for the user to know the international and national direct dialing prefixes used in each country.

With "+" code dialing functionality, the mobile UE needs to identify uniquely the current serving country so that it can automatically translate to the correct national or international direct dialing prefix. CDMA standards allow base stations to transmit Mobile Country Code (MCC) and Mobile Network Code (MNC) to help identify the country where a mobile UE has acquired service. However, most CDMA operators do not transmit valid MCC parameters, so that in most cases, the mobile UE cannot obtain the MCC information directly from base station transmissions. In some CDMA systems, for example, "wildcard" values are transmitted in place of actual values for MCC and MNC. To compensate for not having the MCC information, some operators employ specific solutions, such as feature notification, to provide a text message with the name of the current serving country. However, including feature notification is not universally employed. Hence, in some mobile phone scenarios, the serving country is not known.

Typical CDMA networks transmit certain parameters which may be used to automatically identify the current serving country. This information facilitates implementation of "+" code dialing. For example, the System Identification (SID) specifies the set of all base stations within a service area. In one example, the SID is specified with 15 bits. In another example, the Network Identification (NID) specifies a subset of base stations within a service area, for example, a group of base stations controlled by a single base station controller. In one example, the NID is specified with 16 bits. Both the SID and NID are broadcast by base stations so that mobile UEs may determine the system and network. In addition, base stations also broadcast a local time offset (LTM), which is a 6 bit correction value to system time and the DAYLT flag, which is a 1 bit indicator which specifies if daylight savings is in effect or not. These parameters may be used to help identify the current serving country.

Figure 3:
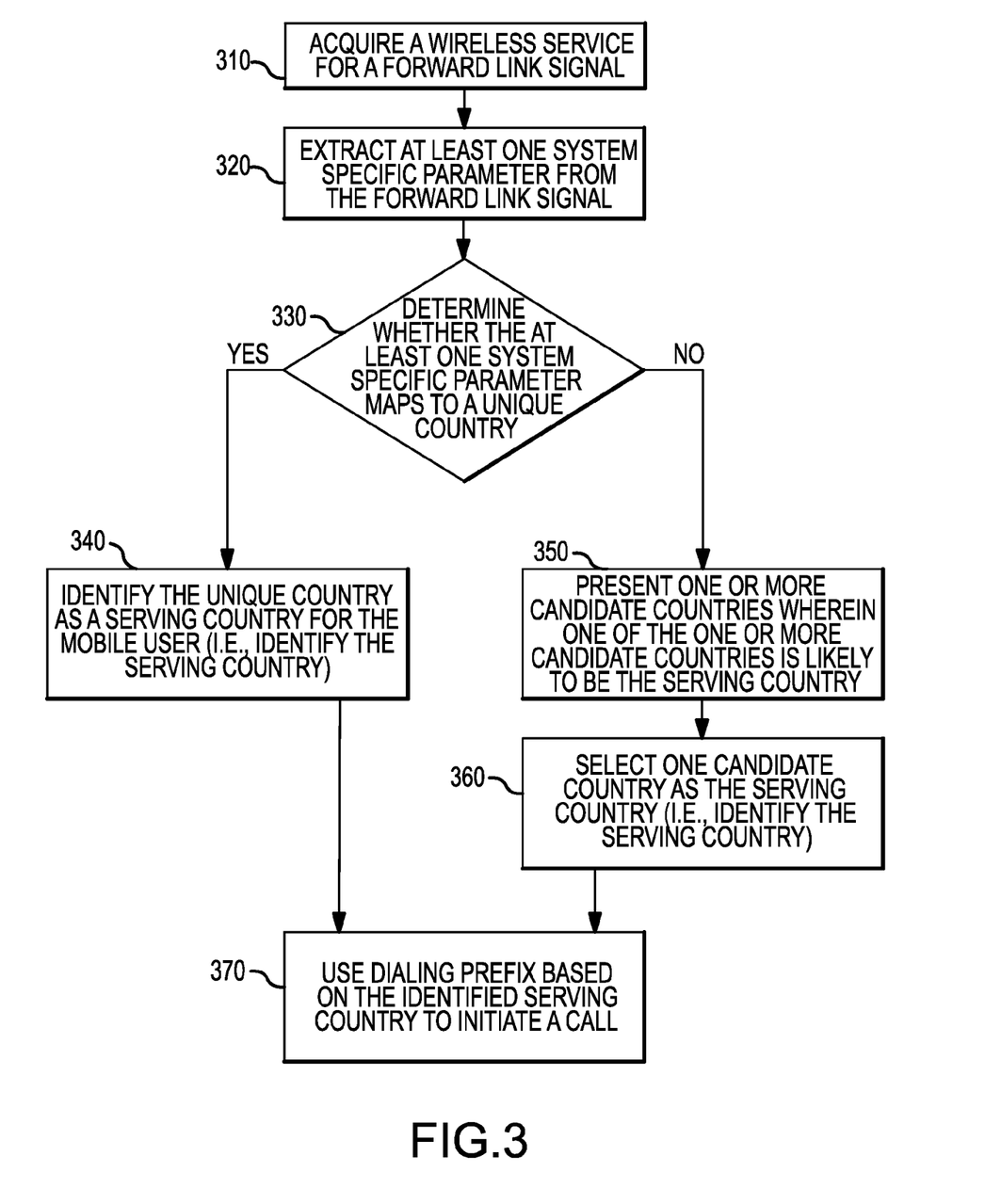
FIG. 3 illustrates an example flow diagram for identifying a serving country from system specific parameters.

FIG. 3 illustrates an example flow diagram for identifying a serving country using system specific (e.g., over the air) parameters. In block 310, acquire a wireless service. In one aspect, a user equipment (UE) acquires wireless service for a forward link signal from a base station. In block 320, extract at least one system specific parameter from the forward link signal. In one aspect, the at least one system specific parameter includes system identification number, bandclass (i.e., frequency band) information, network identification number, local time offset or daylight savings information. Or, more particularly, the at least one system specific parameter includes System Identification (SID), bandclass (i.e., frequency band) information, Network Identification (NID), local time offset (LTM), daylight savings information (DAYLT), etc. One skilled in the art would understand that other system specific parameters may be included or used without affecting the scope or spirit of the present disclosure. In block 330, determine whether the at least one system specific parameter maps to a unique country. For example, determine whether a country resolution logic can map the at least one system specific parameter to a unique country. In one aspect the SID parameter is used by the country resolution logic to map to a unique country. In one example, SID parameters are stored in a look-up table which lists each SID parameter and its corresponding unique country.

However, in some cases, the SID parameter alone cannot uniquely map to a country because some CDMA operators use SID parameters officially assigned to other operators, which causes a country resolution conflict. To resolve this conflict, further resolution criteria such as bandclass (i.e., frequency band) information, NID, LTM, and DAYLT are used either separately or in combination to identify a unique country. One skilled in the art would understand that many logic algorithms can be executed to process one or more of the resolution criteria to identify a unique country without affecting the spirit or scope of the present disclosure.

If the country resolution logic can map the system specific parameter(s) to a unique country (i.e., yes), proceed to block 340. In block 340, identify the unique country as a serving country for the UE. Hence, the serving country is identified in block 340. If the country resolution logic cannot map the system specific parameter(s) to a unique country (i.e., no), then proceed to block 350. In block 350, present one or more candidate countries wherein one of the one or more candidate countries is likely to be the serving country. One skilled in the art would understand that a list of candidate countries can be preprogrammed, and in some instances, a subset of the preprogrammed list is presented based on other available information which, for example, a UE user can input or may be known. In one example, one of the candidate countries is listed as "country not present" signifying that the correct serving country may not be part of the candidate countries presented.

In block 360, select one candidate country from the one or more candidate countries as the serving country. In one aspect, the UE user makes the selection in block 360. In one aspect, the UE user makes use of other auxiliary information such as, but not limited to, personal knowledge, global positioning system (GPS) information, etc. to make the selection in block 360. Hence, the serving country is identified in block 360. Following block 360, in block 370, use dialing prefix based on the identified serving country to initiate a call. Once the serving country has been identified, the dialing prefix associated with that serving country would be made available, for example through a look-up table, for initiating a call.

One skilled in the art would understand that the steps disclosed in the example flow diagram in FIG. 3 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform. the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

Figure 4:
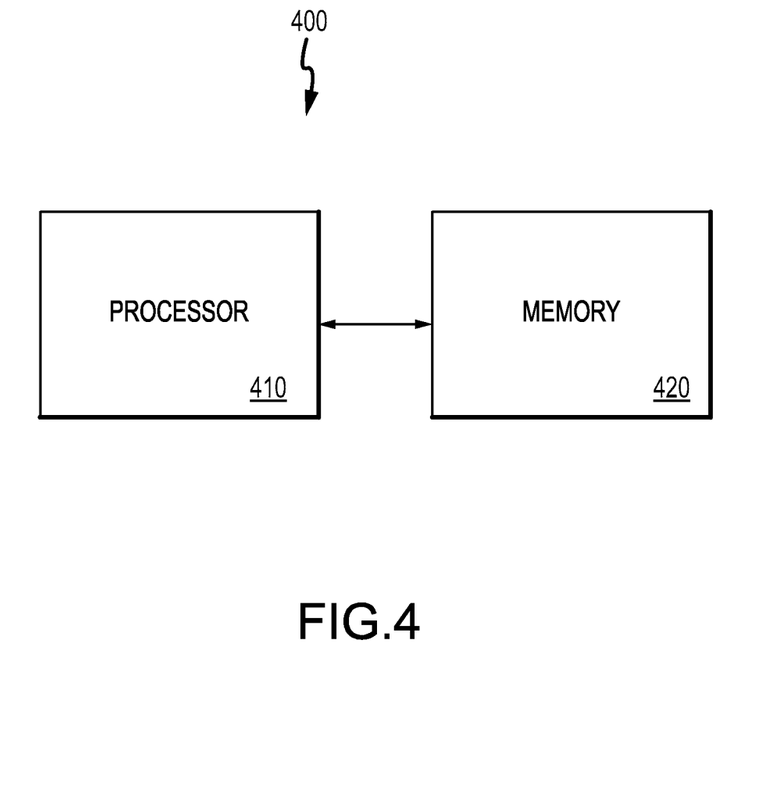
FIG. 4 illustrates an example of a device comprising a processor in communication with a memory for executing the processes for identifying a serving country using system specific parameters.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 4 illustrates an example of a device 400 comprising a processor 410 in communication with a memory 420 for executing the processes for identifying a serving country using system specific (e.g., over the air) parameters. In one example, the device 400 is used to implement the algorithm illustrated in FIG. 3. In one aspect, the memory 420 is located within the processor 410. In another aspect, the memory 420 is external to the processor 410.

Figure 5:
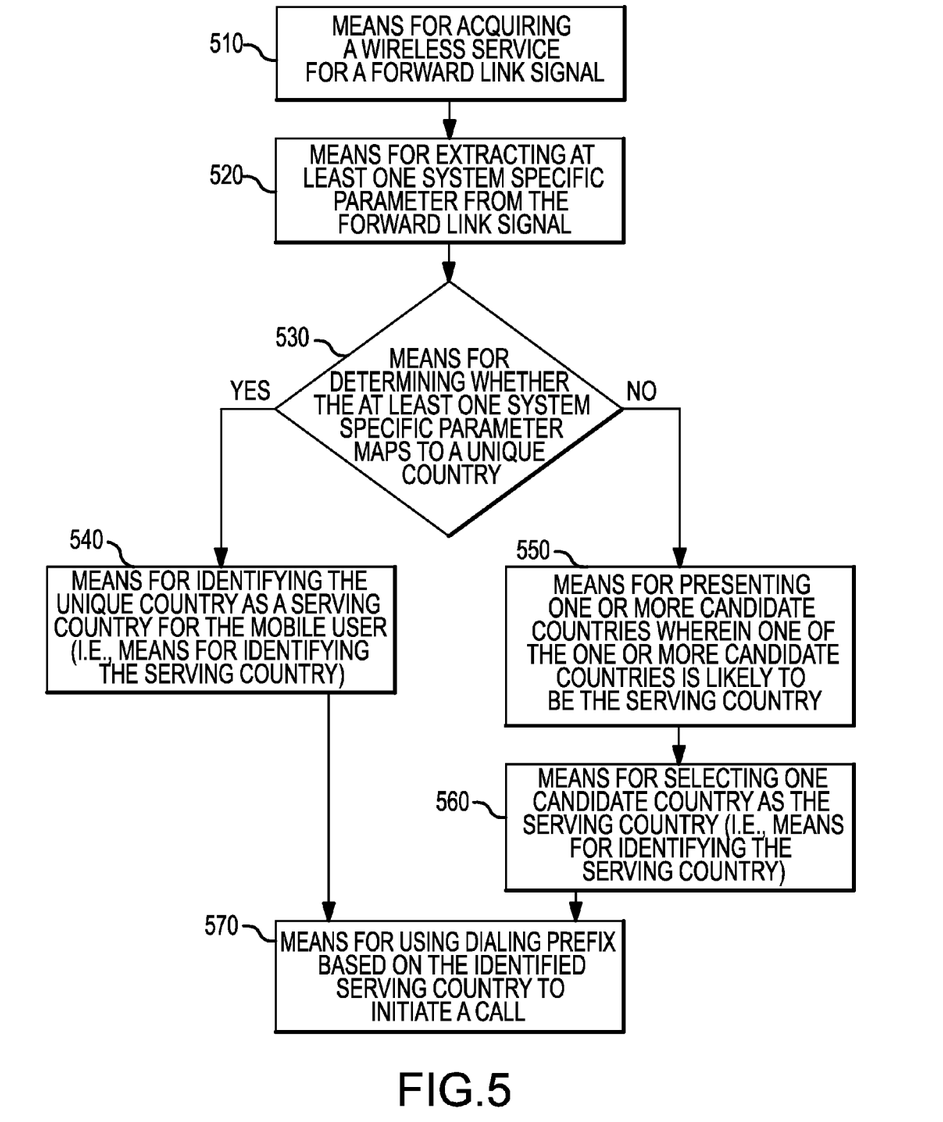
FIG. 5 illustrates an example of a device suitable for identifying a serving country using system specific parameters.

FIG. 5 illustrates an example of a device 500 suitable for identifying a serving country using system specific (e.g., over the air) parameters. In one aspect, the device 500 is implemented by at least one processor comprising one or more modules configured to provide different aspects of identifying a serving country using system specific (e.g., over the air) parameters. as described herein in blocks 510, 520, 530, 540, 550, 560 and 570. For example, each module comprises hardware, firmware, software, or any combination thereof. In one aspect, the device 500 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for identifying a serving country using at least one system specific parameter comprising:
    extracting a first system specific parameter and a second system specific parameter from a forward link signal;
    determining that the first system specific parameter does not map to a unique country;
    determining, in response to determining that the first system specific parameter does not map to a unique country, that the second system specific parameter in combination with the first system specific parameter does not map to a unique country;
    upon detecting a failure in mapping to a unique country, identifying and presenting one or more candidate countries;
    receiving a selection of one of the one or more candidate countries; and
    identifying the serving country for a call based on the selection.

2. The method of claim 1, wherein the one or more candidate countries is likely to be the serving country.

3. The method of claim 1, wherein receiving a selection at least comprises selecting one of the one or more candidate countries as the serving country.

4. The method of claim 3, further comprising using a dialing prefix based on the identified serving country to initiate the call.

5. The method of claim 4, further comprising acquiring a wireless service for the forward link signal.

6. The method of claim 1, wherein each of the first and second system specific parameter comprises one or more of a system identification number, bandclass information, a network identification number, a local time offset or daylight savings information.

7. The method of claim 1, further comprising:
    obtaining at least one of a local time offset (LTM) or daylight savings information (DAYLT); and wherein identifying the serving country is based at least in part upon at least one of the LTM or the DAYLT.

8. The method of claim 1, further comprising:
obtaining a preprogrammed list of the one or more candidate countries; and
wherein identifying the serving country further comprises selecting one of the one or more candidate countries from the preprogrammed list.

9. The method of claim 1, further comprising:
obtaining a user input that defines at least one of the one or more candidate countries; and
wherein identifying the serving country is based at least in part upon the user input.

10. A user equipment for identifying a serving country using at least one system specific parameter comprising a processor and circuitry for performing the steps of:
extracting a first system specific parameter and a second system specific parameter from a forward link signal;
determining that the first system specific parameter does not map to a unique country;
determining, in response to determining that the first system specific parameter does not map to a unique country, that the second system specific parameter in combination with the first system specific parameter does not map to a unique country;
upon detecting a failure in mapping to a unique country, identifying and presenting one or more candidate countries;
receiving a selection of one of the one or more candidate countries; and
identifying the serving country for a call based on the selection.

11. The user equipment of claim 10, wherein the one or more candidate countries is likely to be the serving country.

12. The user equipment of claim 10, wherein receiving a selection at least comprises selecting one of the one or more candidate countries as the serving country.

13. The user equipment of claim 12, wherein the processor and circuitry use a dialing prefix based on the identified serving country to initiate the call.

14. The user equipment of claim 13, wherein the processor and circuitry acquire a wireless service for the forward link signal.

15. The user equipment of claim 10, wherein each of the first and second system specific parameter comprises one or more of a system identification number, bandclass information, a network identification number, a local time offset or daylight savings information.

16. The user equipment of claim 10, wherein the user equipment is a mobile phone.

17. The user equipment of claim 10, wherein the processor and circuitry further perform obtaining at least one of a local time offset (LTM) or daylight savings information (DAYLT), and wherein identifying the serving country is based at least in part upon at least one of the LTM or the DAYLT.

18. The user equipment of claim 10, wherein the processor and circuitry further perform obtaining a preprogrammed list of the one or more candidate countries, and wherein identifying the serving country further comprises selecting one of the one or more candidate countries from the preprogrammed list.

19. The user equipment of claim 10, wherein the processor and circuitry further perform obtaining a user input that defines at least one of the one or more candidate countries, and wherein identifying the serving country is based at least in part upon the user input.

20. A wireless device for identifying a serving country using at least one system specific parameter comprising:
means for a first system specific parameter and a second system specific parameter from a forward link signal;
means for determining that the first system specific parameter does not map to a unique country;
means for determining, in response to determining that the first system specific parameter does not map to a unique country, that the second system specific parameter in combination with the first system specific parameter does not map to a unique country;
upon detecting a failure in mapping to a unique country, means for identifying and presenting one or more candidate countries;
means for receiving a selection of one of the one or more candidate countries; and
means for identifying the serving country for a call based on the selection.

21. The wireless device of claim 20, wherein the one or more candidate countries is likely to be the serving country.

22. The wireless device of claim 21, wherein the means for receiving a selection at least includes means for selecting one of the one or more candidate countries as the serving country.

23. The wireless device of claim 22, further comprising means for using a dialing prefix based on the identified serving country to initiate the call.

24. The wireless device of claim 20, wherein each of the first and second system specific parameter comprises one or more of a system identification number, bandclass information, a network identification number, a local time offset or daylight savings information.

25. A program recorded on a non-transitory computer-readable medium and executable by a computer, comprising:
program code for extracting a first system specific parameter and a second system specific parameter from a forward link signal;
program code for determining that the first system specific parameter does not map to a unique country;
program code for determining, in response to determining that the first system specific parameter does not map to a unique country, that the second system specific parameter in combination with the first system specific parameter does not map to a unique country;
upon detecting a failure in mapping to a unique country, program code for identifying and presenting one or more candidate countries;
program code for receiving a selection of one of the one or more candidate countries; and
program code for identifying the serving country for a call comprising selecting one of the one or more candidate countries as the serving country based on the selection.

* * * * *